United States Patent [19]

Samejima et al.

[11] Patent Number: 4,936,885
[45] Date of Patent: Jun. 26, 1990

[54] TERRAIN TRAVERSING APPARATUS HAVING MEANS FOR TRANSFERRING GRASS CLIPPINGS TO A COLLECTION BOX

[75] Inventors: Kazuo Samejima; Hironori Tsuchihashi; Toshihiko Hamada; Hiroaki Kawakita, all of Osaka, Japan

[73] Assignee: Kubota Ltd., Osaka, Japan

[21] Appl. No.: 184,435

[22] Filed: Apr. 21, 1988

Related U.S. Application Data

[63] Continuation-in-part of Ser. No. 889,364, Jul. 25, 1986.

[30] Foreign Application Priority Data

Aug. 6, 1987 [JP] Japan .................. 62-120689[U]

[51] Int. Cl.$^5$ ............................................. A01D 34/70
[52] U.S. Cl. ........................................ 56/13.3; 56/16.6
[58] Field of Search ...................... 56/202, 16.6, 13.3

[56] References Cited

U.S. PATENT DOCUMENTS

| | | |
|---|---|---|
| 3,402,536 | 9/1968 | Hale et al. ............... 56/DIG. 22 |
| 3,583,134 | 6/1971 | Kemper et al. ............... 56/13.3 |
| 3,657,865 | 4/1972 | Ober ............................ 56/13.3 |
| 3,906,709 | 9/1975 | Rhodes ........................ 56/13.3 |
| 3,925,968 | 12/1975 | Wagenhals .................. 56/13.3 |
| 3,974,629 | 8/1976 | Russel et al. ................ 56/13.7 |
| 4,103,477 | 8/1978 | Mullet et al. ................... 56/6 |
| 4,114,353 | 9/1978 | Ansbaugh et al. ........... 56/13.3 |
| 4,188,160 | 2/1980 | Corbett et al. .............. 56/13.3 |
| 4,304,141 | 12/1981 | Tone et al. ................... 74/15.2 |
| 4,321,783 | 3/1982 | Kawasaki et al. ............ 56/15.8 |
| 4,573,306 | 3/1986 | Smith et al. ................. 56/13.6 |
| 4,614,080 | 9/1986 | Hoepfner et al. ............ 56/16.6 |
| 4,621,699 | 11/1986 | Slazas .......................... 180/53.7 |
| 4,735,037 | 5/1988 | Benter ......................... 56/16.6 |

FOREIGN PATENT DOCUMENTS 1251570  10/1967  Fed. Rep. of Germany .

Primary Examiner—John Weiss

[57] ABSTRACT

A power vehicle is equipped with a mower which has cutters, a clipping passage for transporting grass clippings therethrough to one side of the mower, and an impeller accommodated in a housing and mounted on a lateral shaft. The housing has an outer side plate supporting the shaft and positioned closer to the center of the vehicle at its rear end than at its front end and is thereby diminished in the amount of projection. The impeller is driven by a shaft transmission coupled to a belt transmission for driving the cutters and by a belting transmission. The belting transmission includes a pulley coupled to the shaft transmission, a pulley attached to the outer end of the lateral shaft, and a belt reeved around the pulleys and drivingly movable in parallel to the outer side plate of the housing outside thereof.

15 Claims, 8 Drawing Sheets

TERRAIN TRAVERSING APPARATUS HAVING MEANS FOR TRANSFERRING GRASS CLIPPINGS TO A COLLECTION BOX

This application is a continuation-in-part of Ser. No. 889,364, filed on July 25, 1986, pending.

The present invention relates to a terrain traversing apparatus comprising a mower and a collection box which are mounted on a ground running power vehicle for cutting grass or the like by the cutter of the mower and accommodating the clippings in the collection box.

DESCRIPTION OF RELATED ART

U.S. Pat. No. 4,114,353 (conventional device 1), U.S. Pat. No. 4,614,080 (conventional device 2), etc. disclose terrain traversing devices which comprise a mower mounted on a two-axle four-wheel power vehicle under the vehicle body between the front and rear wheels and which are so adapted that the clippings of grass cut by the cutter of the mower are collected in a bag by transfer means through a duct.

The conventional device 1 includes an impeller disposed at a clipping discharge opening at one side of the mower deck, the impeller being rotatable about a vertical axis. Through a belt, the impeller is driven by the power delivered from a transmission for driving the cutting blades. Since the impeller is positioned close to the opening, the grass clippings can be effectively forced into the collection bag.

However, the device has the following drawbacks since the belt drives the impeller about a vertical axis. The belt is reeved around pulleys, and therefore undergoes marked fatigue and is liable to damage early on in its use. The impeller, which is heavily loaded, not only reduces the durability of the belt but also adversely affects the operation of the cutter.

The blades of the impeller revolve around the vertical axis and therefore impede the flow of clippings cut off by the cutter and discharged, further resulting in the drawback of requiring an impeller housing projecting laterally outward a large distance from the vehicle. Further because the impeller housing has a flat bottom plate, the housing has difficulty in smoothly moving along the ground, possibly cutting raised portions of the ground with its front edge.

The conventional device 2 includes a blower rotatable about a horizontal axis and disposed close to a clipping discharge opening at one side of the mower deck. The blower is accommodated in a housing the rear side of which is positioned inwardly of its front side when seen from above, so that the device has the advantage of being smaller than the device 1 in the amount of projection of the blower housing.

However, the device 2 has the same problem as the device 1 because the blower is driven through a belt. Moreover, since the belt is driven as positioned inwardly of the blower housing, the belt is bent with a reduced angle, and is likely to become damaged quickly and diminishes the acting area of the blower blades.

OBJECTS AND SUMMARY OF THE INVENTION

A first object of the present invention is to use a transmission shaft for driving an impeller for transporting grass clippings to a collection box with power selectively delivered from a cutter drive assembly so as to assure the transmission of torque more accurately and reliably than when a belt is used.

A second object of the present invention is to drive the impeller through a transmission shaft branching from the cutter drive assembly and to render the impeller drivingly rotatable about a horizontal lateral axis, thereby reducing the amount of lateral outward projection of the impeller and enabling the impeller to draw in the grass clippings axially thereof and discharge the clippings tangentially thereof, so that the clippings will flow through the discharge portion smoothly with a reduced likelihood of jamming.

A third object of the present invention is to use the above transmission shaft branching from the cutter drive assembly for rotating the impeller about the lateral axis, along with a universal joint provided at a lengthwise intermediate portion of the transmission shaft for absorbing the load on the impeller and reducing the likelihood that the rotation of the cutter will involve irregularities.

A fourth object of the invention is to accommodate the impeller, which is rotatable about the lateral axis, in a housing having a bottom portion which is circular when seen sideways so that the impeller housing smoothly follows undulations of the ground with reduced likelihood of scalping raised portions of the ground, the impeller housing being oriented rearwardly inward when seen from above to reduce the amount of projection of the housing, the housing being provided on its outer side with belt drive means for transmitting shaft-transmitted power to the impeller, the belt drive means being so disposed as not to project outward beyond the front side of the housing.

A fifth object of the invention is to provide a mower having the construction described above and liftably attached to a vehicle by a link assembly, with impeller-driving shaft transmission means disposed outwardly of the link assembly so as to render the mower liftable without interfering with the transmission case for the shaft transmission means.

BRIEF DESCRIPTION OF THE DRAWINGS

FIG. 1 is a plan view partly broken away;
FIG. 2 is a fragmentary plan view;
FIG. 3 is a rear view partly broken away;
FIG. 4 is a diagram showing a power system;
FIG. 5 is a diagram showing another power system;
FIG. 6 is an overall side elevation;
FIG. 7 is an overall plan view partly broken away;
FIG. 8 is an overall side elevation;
FIG. 9 is an overall rear view partly broken away;
FIG. 10 is a side elevation in section of a power take-off assembly;
FIG. 11 is a fragmentary plan view;
and
FIG. 12 is a diagram of a power system.

DESCRIPTION OF THE PREFERRED EMBODIMENTS

Figure 6:
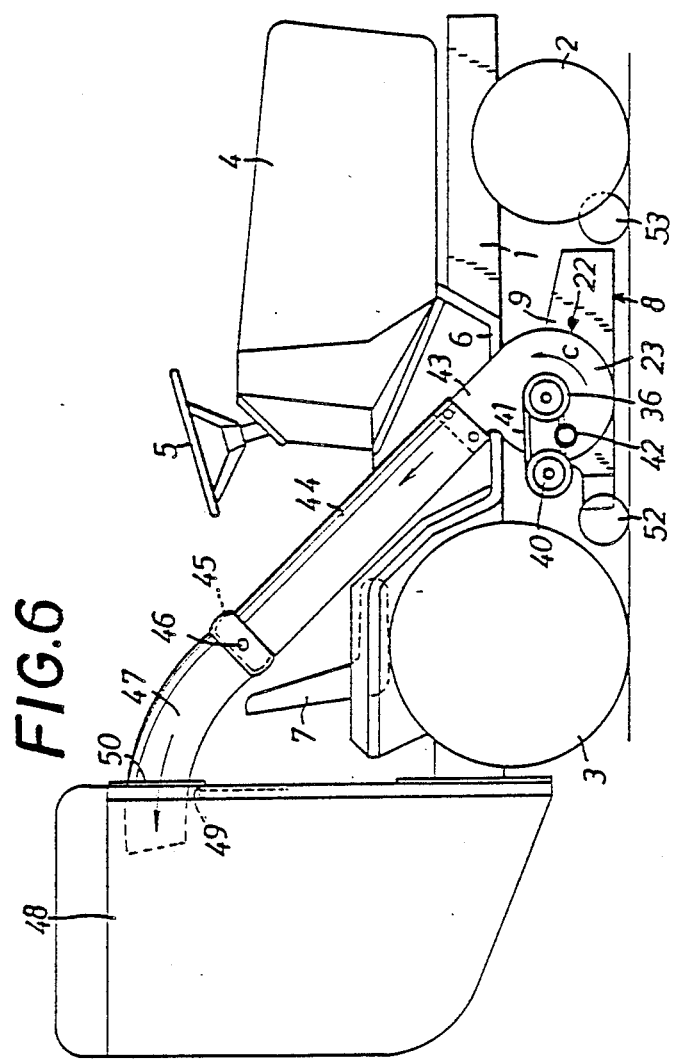
Figure 7:
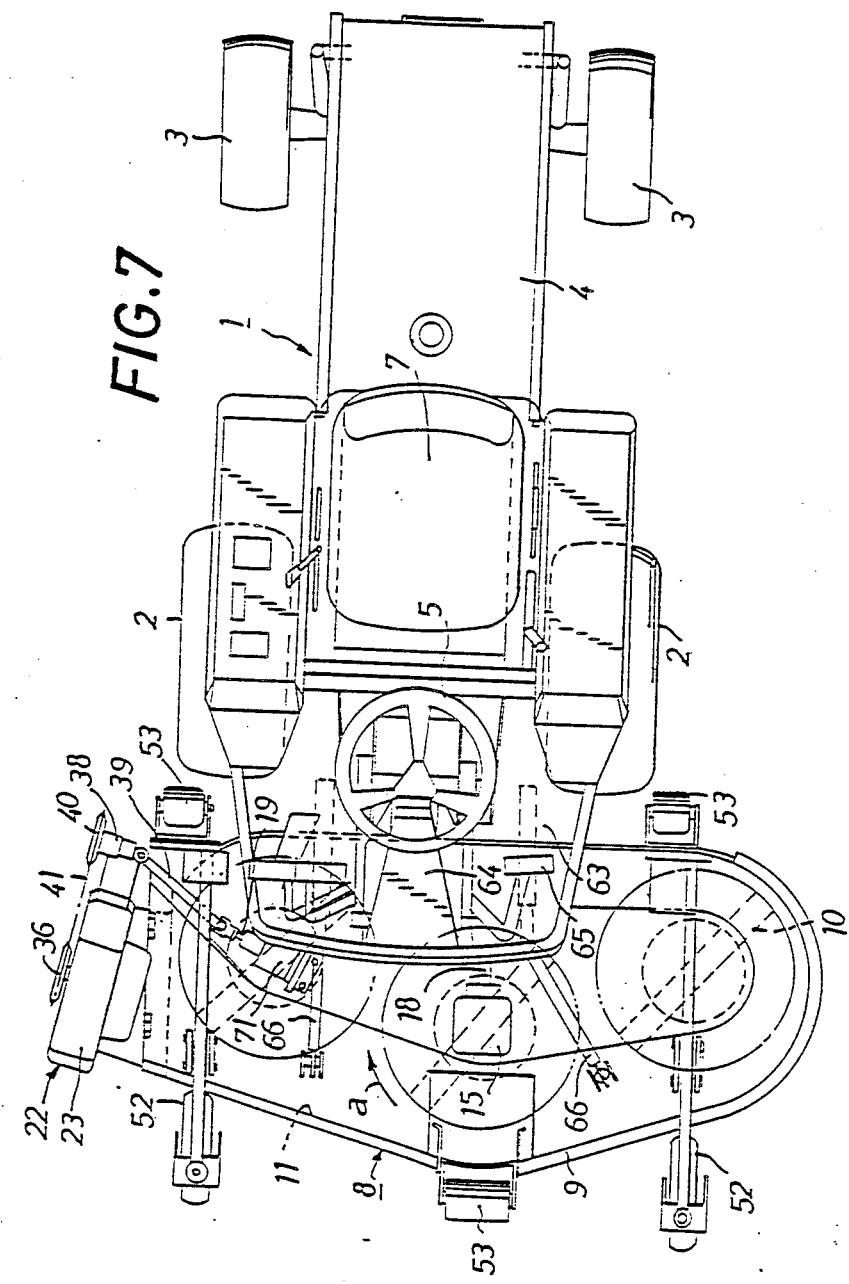
FIGS. 7 to 12 show another embodiment of the invention.
Figure 8:
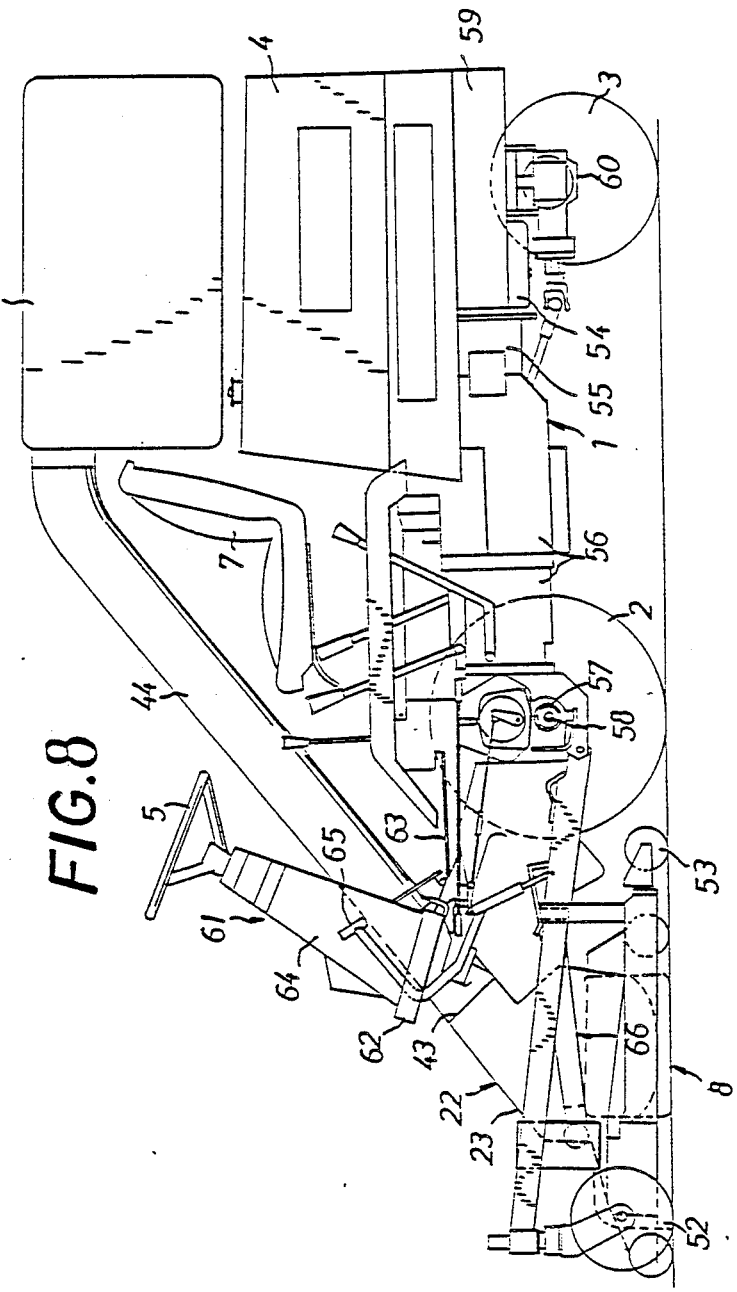
Figure 9:
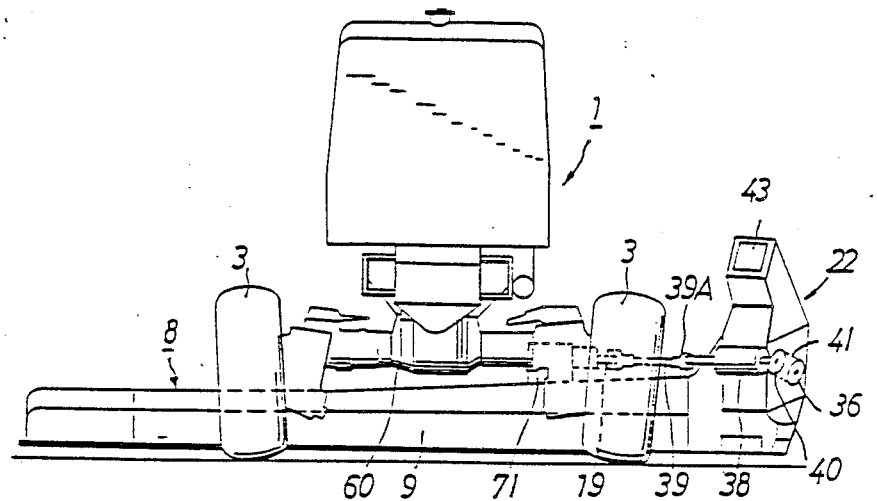
Figure 10:
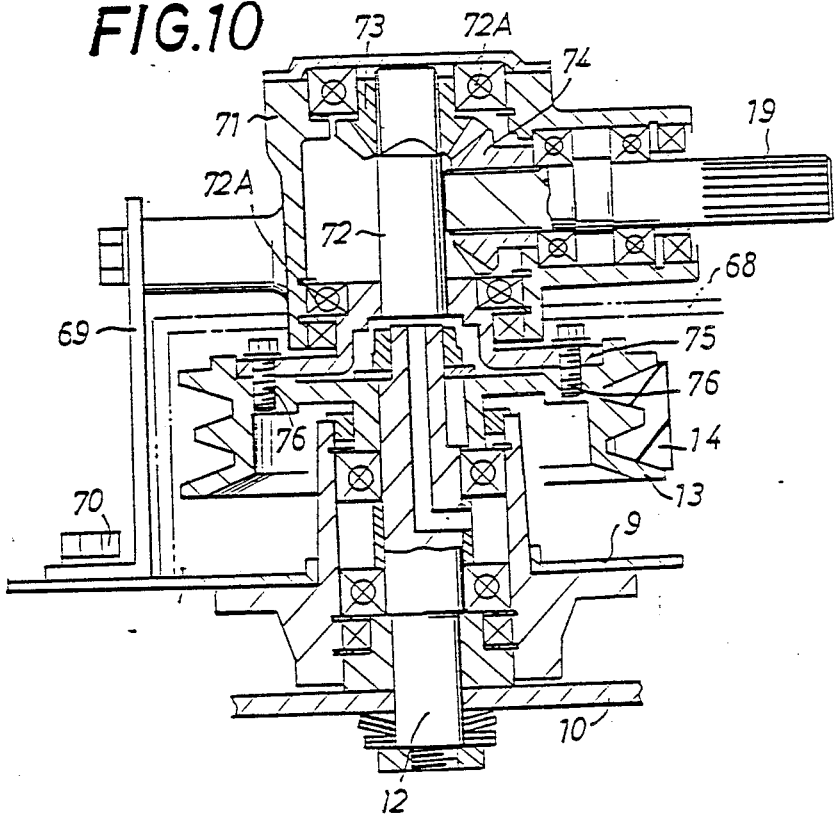
Figure 11:
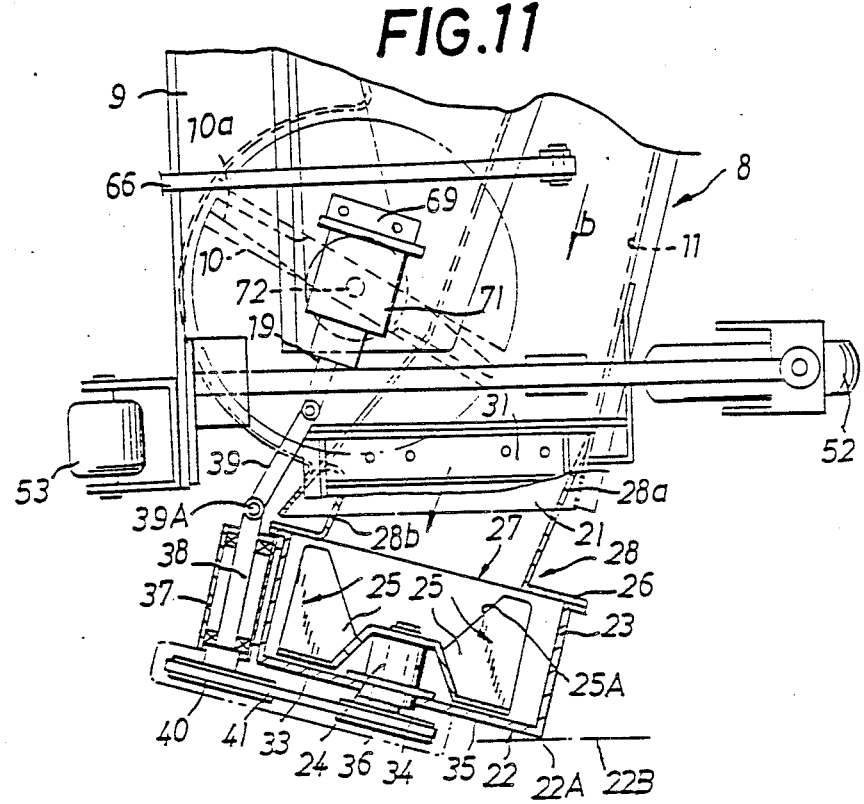
Figure 12:
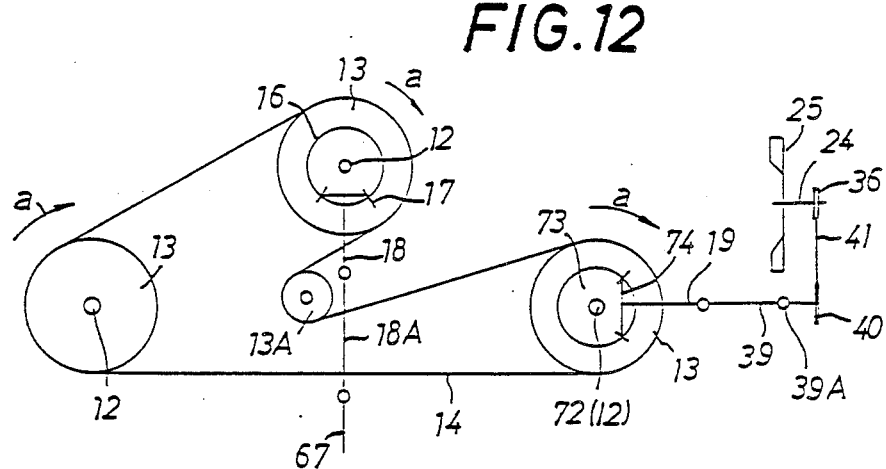

Embodiments of the present invention will be described below with reference to the drawings, in which like parts are designated by like reference numerals. Referring to FIG. 6 showing the overall construction of a first embodiment, the running power vehicle shown has front wheels 2 and rear wheels 3 on the vehicle body 1 and is therefore of the two-axle four-wheel type.

It is further of the riding type and has a bonnet 4, a steering wheel 5, steps 6 and a seat 7.

A mower 8 is vertically movably attached to the bottom of the vehicle body 1 between the front and rear wheels 2, 3 by unillustrated parallel link means or the like. A collection box 48 is provided at the rear of the seat 7.

Figure 1:
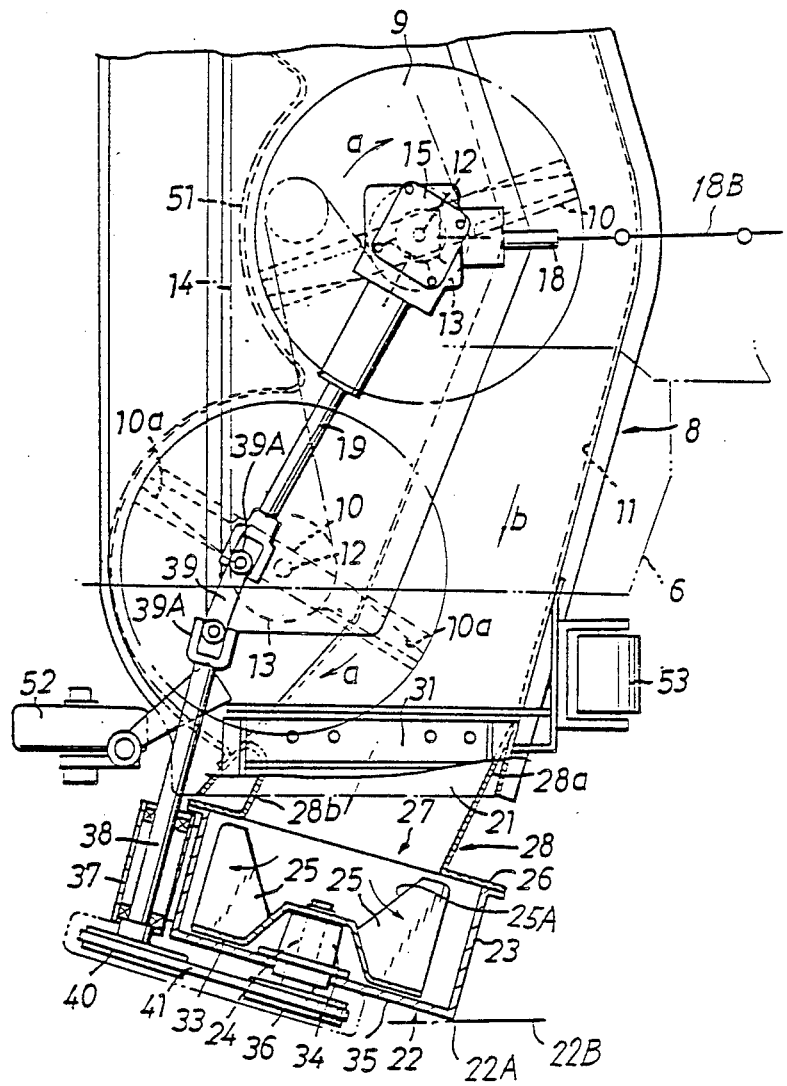
FIGS. 1 to 6 show an embodiment of the invention.
Figure 2:
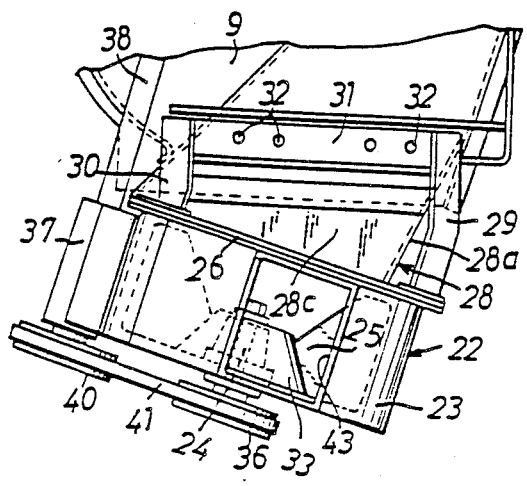
Figure 3:
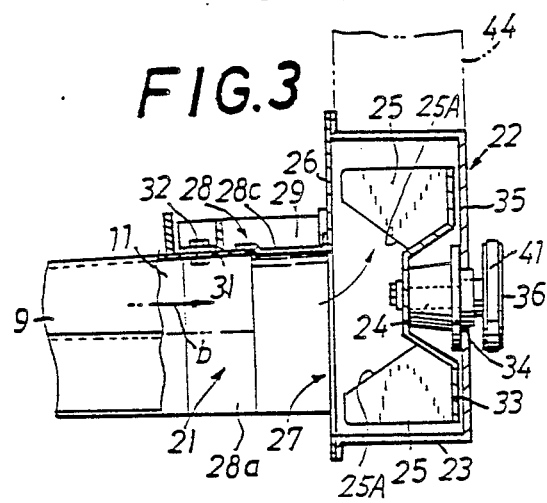
Figure 4:
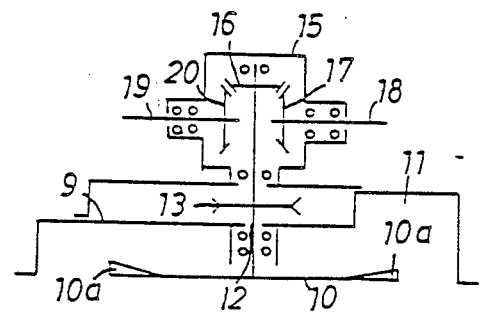

As seen in FIGS. 1 to 3, the mower 8 comprises cutters 10 mounted at the center and opposite sides of a mower deck 9. The mower deck 9 is generally V-shaped when seen from above, projecting forward at its central front portion. A clipping passage 11 projecting upward as shown in FIG. 4 is provided along the front wall of the deck. The cutters 10 are supported on the mower deck 9, each rotatable by a vertical shaft 12. The cutter shaft 12 disposed centrally of the deck 9 drivingly rotates the cutters 10 by means of pulleys 13 and a belt 14.

Thus, at least two cutters are arranged side by side at a spacing transversely of the direction of advance of the vehicle. In the illustrated case, three cutters 10 are provided with one cutter at the center and the two remaining cutters each on opposite sides of the center cutter.

The cutter shaft 12 at the center is inserted in and supported by a transmission case 15 and operatively connected to an input shaft 18 by bevel gears 16, 17 within the case 15 as shown in FIG. 4. Thus, the central cutter 10 is driven directly by the cutter shaft 12. The other cutters 10 are driven by the belt 14 reeved around the pulleys 13 mounted on their shafts 12.

The input shaft 18 extends in the direction of working travel of the vehicle and is operatively connected to a front PTO (Power take off) shaft at the front of the body 1 by a joint shaft 18B according to the first embodiment. The transmission case 15 has a power takeoff shaft 19 extending therefrom laterally rearward and operatively connected to the bevel gear 16 by a bevel gear 20.

Thus, the input shaft 18 provides power input means, while the bevel gears 16, 17 constitute a cutter drive assembly. The torque delivered from the input means is divided by the bevel gear 20 in mesh with the bevel gear 16 into two portions, one for driving the cutters and the other for driving the impeller means to be stated below.

Figure 5:
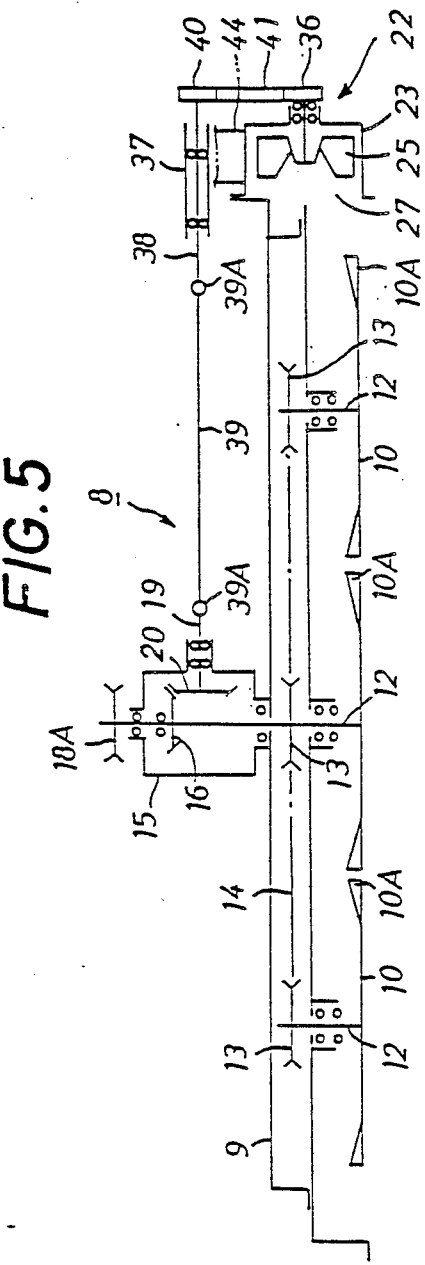

Alternatively, the power input means can be provided by a pulley 18A mounted on the central cutter shaft 12 as seen in FIG. 5 and a belt reeved around the pulley 18A.

The grass clippings cut off by the cutters and lifted by an air current produced by portions 10a are directed through the clipping passage 11 to a discharge opening 21 at one side of the mower deck 9. The clipping passage 11 extends from the widthwise midportion of the deck toward the discharge opening 21, as inclined rearward when seen from above. Impeller means 22 are rotatable about a horizontal lateral axis which is opposed to the discharge opening 21.

The impeller means 22 has a housing 23 which is generally circular when seen sideways and includes blades 25 provided within the housing 23 and supported by a horizontal lateral shaft 24.

As shown in FIGS. 2 and 3, the housing 23 has an inner side plate 26 which is formed at its lower portion with an inlet 27 in communication with the discharge opening 21. The inner side plate 26 has attached thereto a guide plate 28 inverted U-shaped in section, surrounding the inlet 27 and projecting toward the discharge opening 21. The guide plate 28 includes front and rear walls 28a, 28b bearing from inside against the front and rear walls defining the discharge opening 21 and a top wall 28c bearing from above on the top wall defining the opening 21. A frame 31 extending longitudinally of the vehicle body is connected to the inner side plate 26 by a pair of front and rear support brackets 29, 30. The frame 31 is removably fastened to the mower deck 9 by four bolts 32.

Thus as seen in FIG. 1, the housing 23 has its rear side positioned inwardly of its front portion with respect to the direction of advance of the vehicle when seen from above.

The blades 25 are attached radially to a flange 33 As shown in FIG. 3, the blade assembly defines at the inlet side thereof an inlet space diametrically increasing toward the inlet 27 so that the clippings from the discharge opening 21 can be readily admitted into the housing 23. The flange 33 is attached to the lateral shaft 24 to provide an impeller. The lateral shaft 24 is rotatably supported by a bearing case 34 on the outer side plate 35 of the housing 23. The shaft 24 carries a pulley 36 at its outer end. Thus, the horizontal lateral shaft 24 has an axis of rotation extending obliquely rearward and intersecting the direction of advance of the vehicle and is supported by the bearing case 34 on the outer side plate 35 in a cantilever fashion. The free end of the shaft 24 is projected toward the inlet 27 and is positioned within the range of height of the inlet 27 as seen in FIG. 3. A power receiving shaft 38 parallel to the lateral shaft 24 is supported by a bearing case 37 at a rear portion of the housing 23. The power receiving shaft 38 is operatively connected to the power takeoff shaft 19 by a transmission shaft 39 having universal joints 39A. The shaft 38 is also operatively connected to the pulley 36 by a pulley 40 and a belt 41, whereby drive means is provided for the impeller. As seen in FIG. 6, a tension pulley 42 is biased into contact with the belt 41.

The pulleys 36, 40 and the belt 41 reeved around these pulleys constitute belt transmission means, which is disposed along the outer side plate 35 of the housing 23 and is inclined inward without projecting outward beyond the plane 22B of passage of the outermost edge 22A of the housing 23 when seen from above as illustrated in FIG. 1.

As shown in FIG. 6, the housing 23 has at its upper side an outlet 43 oriented rearwardly upward at an angle of about 45 degrees tangentially of the housing 23. A straight duct 44 is attached to the outlet 43. A delivery duct 47 is pivotably connected to the upper end of the duct 44 by a ball joint portion 45 and a pin 46. The delivery duct 47 is curved parabolically, loosely inserted in an opening 49 of clipping collection means 48 comprising a collection box, bag or the like and is idly movably supported by a rubber plate 50 on the means 48. The mower 8 has in the rear of the cutters 10 a guide plate having circular arc portions each along the locus of rotation of the cutter blade and is provided with gauge wheels 52 for adjusting the grass cutting level and limit gauge wheels 53.

According to the embodiment shown in FIGS. 1 and 4, the transmission 39 has a short length. As seen in FIG. 5, however, the pulley 18A may serve as the power input means, and an elongated transmission shaft 39 may be connected to short power takeoff shaft 19 and power receiving shaft 38 by universal joints 39A splined to these shafts.

While the bevel gears 16, 17 provide the cutter drive assembly, the bevel gear 16 may be positioned under the bevel gears 17, 20 in mesh therewith.

When the apparatus described above is used for cutting grass or the like, the cutters 10 of the mower 8 are rotated by the cutter drive assembly and belt transmission means about their vertical shafts 12 in the direction of arrows a in FIG. 1 to cut grass with the cutters 10, while lifting the clippings by an air current produced by the portions 10a of the cutters 10 and directing the clippings toward the discharge opening 21 through the passage 11 in the direction of arrow b.

On the other hand, the cutter drive assembly within the transmission case 15 dividedly delivers a torque to the power takeoff shaft 19 for driving the impeller. The torque is delivered from the shaft 19 to the lateral shaft 24 via the transmission shaft 39 having the universal joints 39A, power receiving shaft 38, pulleys 40, 36, belt 41, and the like to drive the blades 25 of the impeller means 22 about the shaft 24 in the direction of arrow c in FIG. 6. Thus, the impeller 22 operates during mowing, whereby the clippings are drawn in, thrown upward by the blades 25 and forced into the collection means 48 through the ducts 44, 7. More specifically, when the blades 25 are revolved, the clippings sent to the discharge opening 21 of the passage 11 are drawn via the inlet 27 into the housing 23, revolved along the inner periphery of the housing 23 by being thrown upward by the blades 25, discharged from the outlet 43 and sent into the collection means 48 via the ducts 44, 47. Thus, the clippings can be collected simultaneously with mowing.

The impeller 22, which has a lateral axis, axially draws in the clippings forwarded via the passage 11 and throws them upward with its blades 25, permitting the clippings to flow smoothly without accumulating at the discharge opening 21 or the inlet 27. The lateral shaft 24 is supported in a cantilever fashion by the bearing case 34 on the outer side plate 35, with its free end extending toward the inlet 27 and positioned within the range of height of the inlet 27, and therefore permits smooth admission of the clippings into the housing 23 when they are sent forward in the direction of arrow b shown in FIG. 3 with a reduced likelihood of impeding the flow of clippings. The blades 25 are further allowed to force up the clippings with their acting faces of sufficient area. The blades 25 have inner edges 25A extending radially outwardly of the lateral shaft 24 toward the inlet 27 as seen in FIG. 3 for smoothly introducing clippings into the housing 23 to preclude clippings from accumulating in the inlet 27 and the housing 23. Since the clippings axially drawn in are thrown up by the blades 25 and discharged from the outlet 43 tangentially of the housing 23, the clippings will not be restrained by the orientation of the outlet 43. As a result, the ducts 44, 47 can be inclined or curved in conformity with the position of the collection means 48 and can therefore be designed to facilitate the flow of clippings. The impeller 22 can be of a small axial dimension, so that the impeller of the lateral axis type can be installed with a reduced amount of laterally outward projection. This permits a mowing operation in the vicinity of obstacles in close proximity to the mower minimize the an unmowed area.

When the vehicle body 1 travels during mowing, the impeller 22 moves up and down along with the mower 8 following the ground surface. At this time, the housing 23, which is circular at its lower portion, will not cut the soil even at a raised ground portion but smoothly follows the ground. When the impeller 22 moves upward and downward, the duct 44 supported by the impeller means also moves similarly. However, since the duct 44 is connected to the delivery duct 47 by the ball joint portion 45 and the pin 46, the ducts 44, 47 flex about the pin 46, while the delivery duct 47 is supported on the collection means 48 by means of rubber plate 50 and is pivotally movable. Consequently, the ducts will not restrain the movement of the impeller 22. The duct 47 is parabolically curved and therefore assures very smooth flow of the clippings.

Even if heavily loaded, the blades 25 can be revolved properly through the transmission shaft 39. The load is partially absorbed by the universal joints 39A of the transmission shaft 39, so that the cutters 10 can be driven free of any adverse effect.

FIGS. 7 to 12 show a second embodiment of the invention which basically has the same construction as the first embodiment, so that only different features will be described below.

The vehicle body 1 shown comprises an engine 54, a clutch housing 55 and a transmission case 56 which are arranged in this order forward and connected together in series. The engine 54 is covered with a bonnet 4 and positioned in the rear portion of the vehicle body. A clipping collection box 48 is mounted on the bonnet 4. A hydraulic stepless speed change unit or mechanical speed change unit is housed in the transmission case 56. Front axle cases 57 extend from opposite sides of the case 56 at its front portion for supporting front drive wheels 2 by front axles 58.

A rear wheel differential 60 is supported by a center pin on a frame 59 projecting rearward from the engine 54. Rear wheels 3 are supported by rear axles laterally projecting from opposite sides of the differential 60. The rear wheels 3 can be driven and steerable.

Disposed above the transmission case 56 is an operator's seat 7, and a steering assembly 61 is provided in front of the seat 7. A support frame 62 projecting forward from the transmission case 56 has a floor sheet 63 thereon and steering post 64 mounted on its front upper portion and supporting a steering wheel 5. Indicated at 65 is a clutch pedal.

A mower 8 is liftably attached to the front end of the vehicle body 1 by a pair of opposite link means 66. The mower has a deck 9 rotatably supporting three cutter shafts 12 in a triangular arrangement. Each shaft 12 has a cutter 10 at its lower end.

A transmission case 15 mounted on the widthwise midportion of the mower deck 9 has the central cutter shaft 12 inserted therein and an input shaft 18 perpendicular to the cutter shaft 12. The input shaft 18 is operatively connected to a PTO shaft 67 of the vehicle by a universal joint shaft 18A and to the central cutter shaft 12 by a pair of bevel gears 16, 17 for power transmission.

Pulleys 13 are mounted on the respective three cutter shafts 12, and a belt 14 is reeved around the pulleys 13 and a tension pulley 13A to provide belt transmission means for transmitting rotation in a specified direction from the drive central cutter shaft 12 to the driven side cutter shafts 12. A cover 68 is provided on the mower deck 9 for covering the belt transmission means.

A bracket 69 is fastened to the mower deck 9 by bolts 70. A transmission case 71 disposed above the right cutter shaft 12 is attached to the bracket 69. A rotary shaft 72 and a power takeoff shaft 19 perpendicular to the rotary shaft are supported by the case 71. A pair of bevel gears 73, 74 mounted on the shafts 72, 19, respectively, are in mesh with each other. The bracket 69 is settable in a desired position about the cutter shaft 12 and may be formed with a circular-arc slot for passing the bolt 70 therethrough.

The rotary shaft 72 is aligned with the cutter shaft 12 and fixedly provided with a rotary member 75 at its lower end. The rotary member 75 is supported by a bearing 72A on the case 71. The rotary member 75 is fastened to the upper side of the pulley (rotary member) 13 on the cutter shaft 12 with bolts 76 and made rotatable therewith. Accordingly, the torque of the central cutter shaft 12 is transmitted to the belt 14 and to the pulley 13, and the rotation of the pulley 13 is transmitted to the driven cutter shaft 12 and, at the same time, also to the rotary shaft 72 through the rotary member 75 to drive the power takeoff shaft 19.

Thus, the rotary shaft 72 and the bevel gears 73, 74 serve as branch transmission means for transmitting the torque of the cutter shaft 12 to an impeller 25 through shaft transmission. The branch transmission means is disposed outwardly of the link means 66, so that the mower 8 is liftable to a sufficient level by the link means 66 with a reduced likelihood of interference with the vehicle body 1 despite the projection of the transmission case 71 from the deck 9.

The branch transmission means of the second embodiment is positioned above the cutter shaft 12 which is closest to the impeller 25. The transmission shaft 39 having the universal joints 39A for transmitting power from the power output shaft 19 to the power receiving shaft 38 therefore can be of a very small length. This means that the overall length of shafts for power transmission to the impeller 25 can be much smaller than in the first embodiment, consequently assuring accurate power transmission through the shafts.

With the exception of the features described above, the second embodiment has nearly the same construction as the first as illustrated. The grass clippings cut off by the cutters 10 are passed through the passage 11 into the inlet 27 of the housing 23, thrown up by the impeller 25 driven about a horizontal lateral axis by the shaft transmission means 37, 38 and the belt transmission means 36, 40, 41 and collected in the box 48 by way of the duct means.

What is claimed is:

1. A terrain traversing vehicle comprising:
a vertically movable mower mounted to said vehicle;
a deck member provided on said mower;
a plurality of vertical cutter shafts supported by said deck member;
a plurality of cutting blades corresponding to each of said plurality of cutter shafts, said plurality of cutting blades being parallel to a cutting surface;
belting means for rotating said plurality of cutter shafts in a clipping direction;
a clipping passage provided in communication with said mower for transferring clippings in a lateral direction away from said vehicle;
horizontally rotatable impeller means mounted on a distal end of said clipping passage for discharging clippings from said clipping passage;
collection means for receiving discharged clippings;
said impeller means including impeller members rotatably supported inside a housing case by a lateral impeller shaft, said lateral impeller shaft being supported at one end by an outer wall of the housing case and communicating at an opposing end with said clipping passage;
outlet means for communicating with said collection means; and
shaft power transmission means and belt transmission means for driving said impeller members, wherein said shaft power transmission means includes a power take off shaft for branching power from said belting means to one of said plurality of cutter shafts positioned closest to said impeller means, a transmission shaft and a power receiving shaft operatively connected to said power take off shaft, wherein said belt transmission means includes pulleys and a belt parallel to the outer wall of the housing case;
said housing case being angled rearwardly at each side of said vehicle with respect to a line transverse to the vehicle travelling direction, wherein each of said power take off shaft, transmission shaft and power receiving shaft are arranged, respectively away from said vehicle in line with said housing case and said belt transmission means is operatively connected to the power receiving shaft outboard of said housing case.

2. The apparatus according to claim 1, wherein a transmission case having bevel gears is provided at a widthwise midportion of said mower deck and an input shaft having its axis directed toward the direction of advance of the vehicle is attached to one of the bevel gears, said power take off shaft having a bevel gear in mesh with the bevel gears of said transmission case.

3. The apparatus according to claim 1, wherein the transmission shaft for operatively connecting the power take off shaft to the power receiving shaft includes universal joints.

4. The apparatus according to claim 1, wherein the power receiving shaft and the lateral impeller shaft have their axes positioned parallel to each other.

5. The apparatus according to claim 1, wherein the lateral impeller shaft includes a free end at the widthwise midportion of the case housing and has its axis positioned transverse to the direction of transport of the clippings through said clipping passage, the lateral impeller shaft being positioned within the range of height of the outlet means and having impeller members attached thereto in a radial arrangement, the impeller members having inner edges extending radially outwardly of the lateral shaft impeller toward an inlet of said impeller means.

6. The apparatus according to claim 1, wherein the housing case accommodating said impeller members is circular in side elevation and has an outlet formed at the upper side of said housing case tangentially thereof.

7. The apparatus according to claim 1, wherein the power vehicle is of the two-axle four-wheel type and is provided with the mower under the vehicle body between front and rear wheels of the vehicle body and with said collection means at the rear portion of the vehicle body for discharging clipping rearward and upward.

8. A terrain travelling vehicle comprising:
a vertically movable mower;
means for suspending said mower from the vehicle;
a deck member provided to cover the surface area of said mower;
a plurality of vertical cutter shafts supported by said deck member;

a plurality of cutting blades corresponding to each of said plurality of vertical cutter shafts, said cutting blades being substantially parallel to a cutting surface;

belting means for rotating said plurality of vertical cutter shafts in a clipping direction;

a clipping passage provided in communication with said mower for transferring clippings in a lateral direction away from said vehicle;

horizontally rotatable impeller means for discharging clippings from said clipping passage;

collection means for collecting discharged clippings, said collection means including duct members extending from said impeller means to said collection means;

said impeller means including impeller blades rotatably supported inside a housing case by a lateral shaft, said lateral shaft being supported at one end by an outer wall of the housing case and communicating at an opposing end with said clipping passage;

outlet means for communicating with said duct members of said collection means; and shaft power transmission means and belt transmission means for driving said impeller blades, wherein said shaft transmission means includes a power take off shaft for branching power from said belting means to one of said plurality of cutter shafts positioned closest to said impeller means, a transmission shaft and a power receiving shaft operatively connected to said power take off shaft, and wherein said belt transmission means includes pulleys and a belt parallel to the outer wall of the housing case;

said housing case being angled rearwardly with respect to a line transverse to the vehicle travelling direction, each of said power take off shaft and said power receiving shaft are arranged, respectively, away from said vehicle in line with said housing case, said belt transmission means being operatively connected to the power receiving shaft outboard of said housing case, and said power take off shaft being branched through a rotary shaft and operatively connected to one of said plurality of cutter shafts positioned closest to said impeller means; and a transmission case projecting from said mower deck and outwardly of said means for supporting, whereby raising and lowering of said deck member does not interfere with said transmission case.

9. The apparatus according to claim 8, wherein the transmission shaft for operatively connecting the power take off shaft to the power receiving shaft has universal joints.

10. The apparatus according to claim 8, wherein the power receiving shaft and the lateral impeller shaft have their axes positioned parallel to each other.

11. The apparatus according to claim 8, wherein the lateral impeller shaft has a free end at the widthwise midportion of the housing case and has its axis positioned transverse to the direction of transport of the clippings through the clipping passage, the lateral impeller shaft being positioned within the range of height of the outlet means and having the impeller blades attached thereto in a radial arrangement, the impeller blades having inner edges extending radially outwardly of the lateral impeller shaft toward an inlet of said impeller means.

12. The apparatus according to claim 8, wherein the housing case accommodating the impeller blades is circular in side elevation and has an outlet formed at the upper side of said housing case tangentially thereof.

13. The apparatus according to claim 8, wherein the rotary shaft has a rotary member at its lower end and is retained in alignment with the vertical cutter shaft by the rotary member, the rotary member being supported by a bearing on the transmission case.

14. The apparatus according to claim 8, wherein the mower is liftably attached to the front end of the vehicle body by a pair of opposite link means, and the transmission case supporting the rotary shaft is positioned outwardly of the link means.

15. The apparatus according to claim 8, wherein the power vehicle is of the two-axle four-wheel type, and the mower is liftably attached to the front end of the vehicle by link means, the front wheels and the rear wheels being drive wheels, the rear wheels being steerable wheels.

* * * * *